Figure 1:
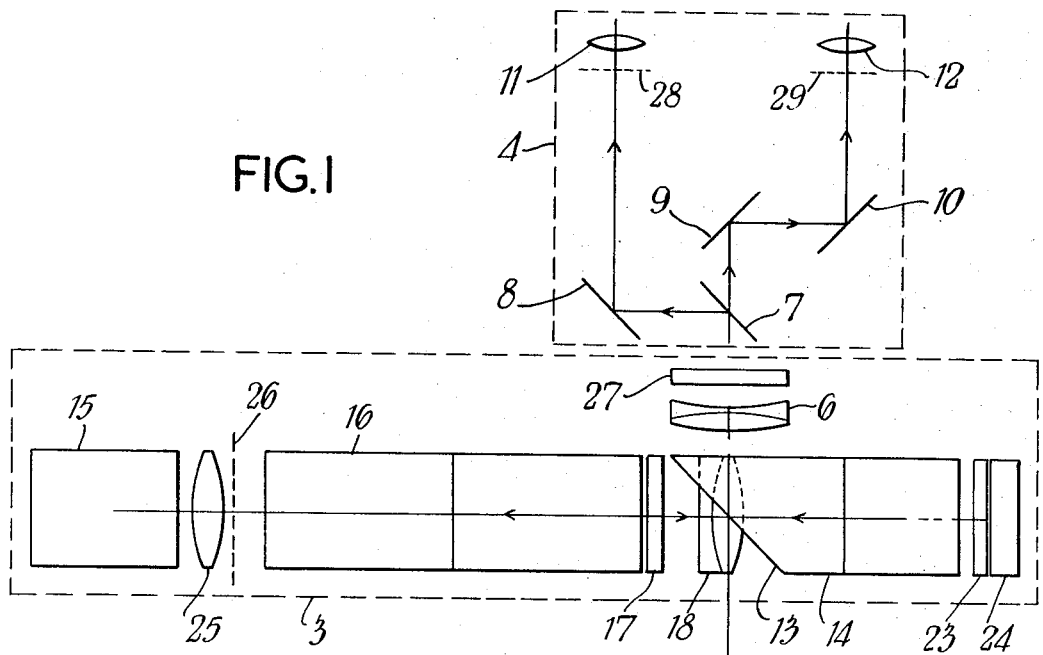

United States Patent [19]
Moore

[11] 3,825,343
[45] July 23, 1974

[54] OPTICAL DEVICES
[75] Inventor: Derek Stanley Moore, York, England
[73] Assignee: Vickers Limited, London, England
[22] Filed: May 2, 1973
[21] Appl. No.: 356,332

[30] Foreign Application Priority Data
May 11, 1972  Great Britain.................... 22234/72

[52] U.S. Cl............... 356/156, 356/163, 73/88.5 R, 33/DIG. 13
[51] Int. Cl. ......................................... G01b 11/00
[58] Field of Search ........ 356/32, 156, 163; 350/35; 73/88.5 R, 100, 161; 33/DIG. 13

[56] References Cited
FOREIGN PATENTS OR APPLICATIONS
1,285,184   8/1972   Great Britain
901,319    7/1962   Great Britain OTHER PUBLICATIONS
"The Direct-Reading DC Strain Gage Bridge," by R. W. Troke, Instruments, May 1951, Pgs. 535–542.

*Primary Examiner*—Ronald L. Wibert
*Assistant Examiner*—Paul K. Godwin
*Attorney, Agent, or Firm*—Yeager, Stein & Wettach

[57] ABSTRACT

An optical device comprises an optical member carried at one end of a flexure spring of which an opposite end is secured to a firm support portion. A light beam incident on the optical member is deflected to an extent that depends on the degree of flexure of the flexure spring, and a strain gauge carried by the flexure spring provides an electrical measure of the said degree of flexure.

10 Claims, 4 Drawing Figures

OPTICAL DEVICES

This invention relates to optical devices.

Image-splitting devices for use in sizing small objects are described in United Kingdom Pat. specifications Nos. 901,319 and 1,285,184. Those specifications both describe devices which comprise a group of plane reflectors, mounted so as to permit adjustment of the disposition of at least one reflector of the group relative to another, for splitting a primary light beam into two secondary image-bearing beams which, downstream of the reflectors, are spaced from one another by a distance which is selectively variable by such adjustment. In practical forms of these devices adjustment of the relative dispositions of the reflectors involves rotation of one of the reflectors relative to the other(s) under control of a lever system by means of a calibrated precision micrometer. The spacing of the two secondary beams is read off on the micrometer. The rotatable reflector is mounted on either plane bearings or ball and cone bearings, and the accuracy of the devices is limited by the precision of the micrometer lead screw, the bearing faces of the lever system and the accuracy of the bearings. All these components are subject to wear in use.

According to a first aspect of the present invention there is provided an optical device, comprising a firm support portion to which is secured one end of a flexure spring an opposite end of which carries an optical member for deflecting a light beam incident thereon to an extent that depends upon the degree of flexure of the flexure spring, there being a strain gauge mounted on the flexure spring for use in providing an electrical measure of the said degree of flexure.

According to a second aspect of the present invention there is provided an optical instrument of the kind having an objective, an eyepiece for viewing real images, of fields of view under investigation, formed at a focal plane thereof by means of the objective, and an image-splitting device arranged between the objective and the eyepiece and comprising a group of plane reflectors, mounted so as to permit adjustment of the disposition of at least one reflector of the group relative to another, for splitting a primary light beam, received from the objective, into two secondary image-bearing beams which, downstream of the said group, are spaced from one another by a distance which is selectively variable by such adjustment, the relatively adjustable reflectors being connected to opposite ends of a flexure spring which undergoes flexure when such adjustment takes place and which carries a strain gauge for use in providing an electrical measure of the degree of flexure of the flexure spring.

According to a third aspect of the present invention there is provided for use in an optical instrument of the kind having an objective and an eyepiece for viewing real images, of fields of view under investigation, formed at a focal plane thereof by means of the objective, an image-splitting device adapted to be arranged between the eyepiece and the objective and comprising a group of plane reflectors, mounted so as to permit adjustment of the disposition of at least one reflector of the group relative to another, for splitting a primary light beam, received from the objective, into two secondary image-bearing beams which, downstream of the said group, are spaced from one another by a distance which is selectively variable by such adjustment, the relatively adjustable reflectors being connected to opposite ends of a flexure spring which undergoes flexure when such adjustment takes place and which carries a strain gauge for use in providing an electrical measure of the degree of flexure of the flexure spring.

Figure 2:
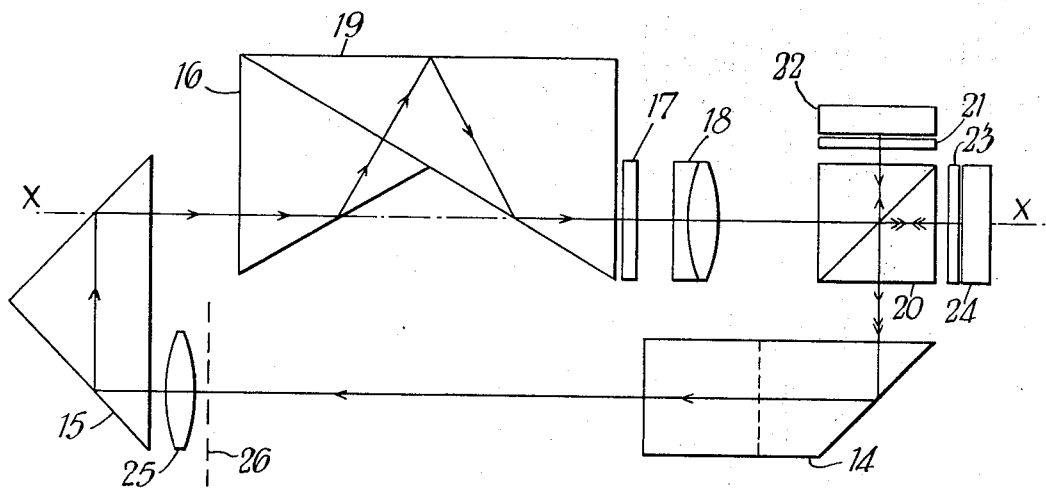
Figure 3:
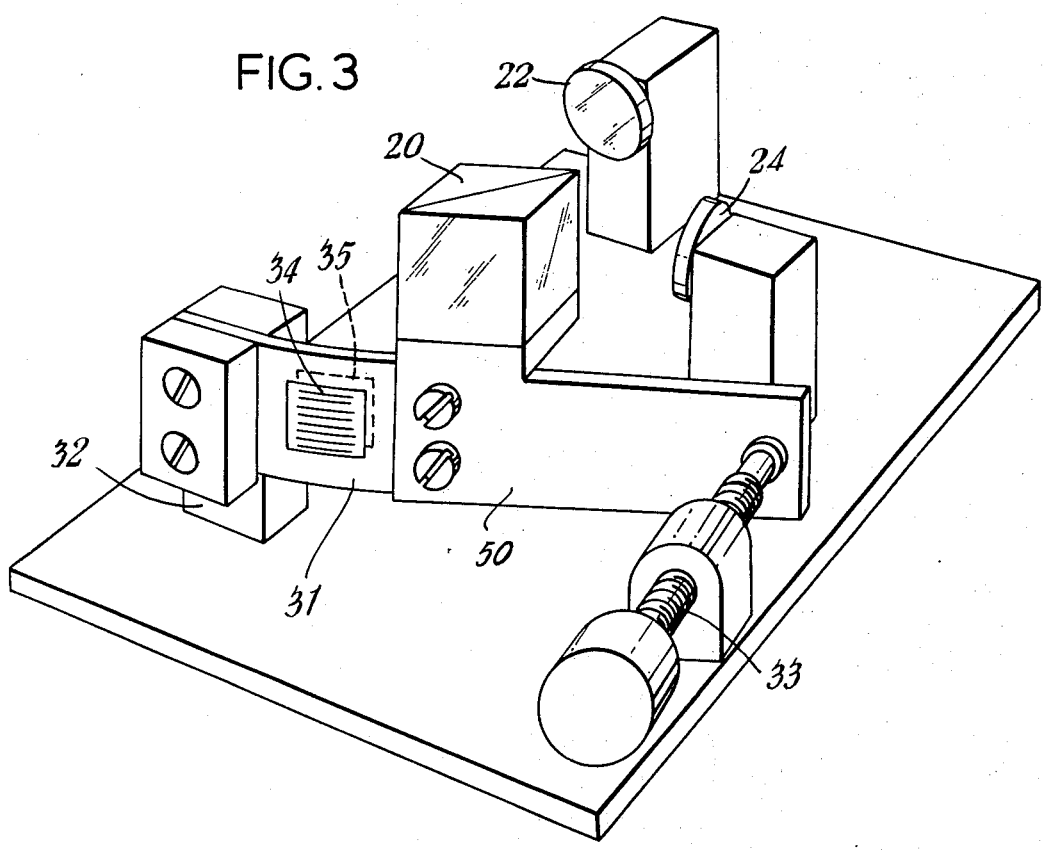
Figure 4:
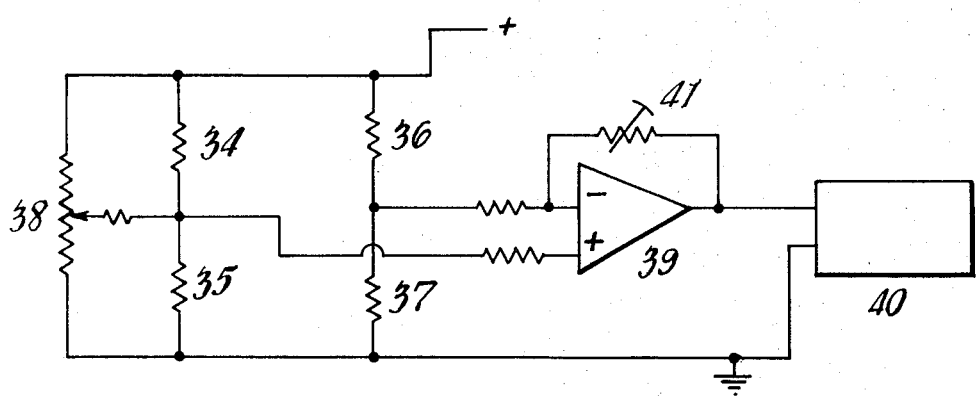

For a better understanding of the invention, and to show how the same may be carried into effect, reference will now be made, by way of example, to the accompanying drawings in which:

FIG. 1 shows diagrammatically an elevation of the optical system of a binocular microscope, FIG. 2 shows a diagrammatic plan view of a part of the system of FIG. 1, FIG. 3 shows a perspective view, drawn to an enlarged scale, of an optical device, including two strain gauges, which forms part of the binocular microscope, and FIG. 4 shows a diagram of an electrical circuit in which the two strain gauges are connected when the device is in use.

The microscope shown in FIGS. 1 and 2 is similar to the microscope shown in FIGS. 1 and 2 of U.K. Pat. specification No. 1,285,184.

FIG. 1 shows a binocular microscope comprising a conventional objective 1, an image splitting system 3, including lenses and reflectors, and a conventional binocular viewing head 4. The objective 1 is shown in a very smplified manner: the objective 1 would of course normally be a compound lens. The objective 1 has a standard Royal Microscopical Society mounting thread 2, and the exit pupil of the objective is at 5.

The binocular viewing head 4 comprises the conventional arrangement of a beam divider made up of an interface 7 which transmits and reflects with equal intensities and three reflecting surfaces 8, 9 and 10, and two eyepieces 11 and 12. The eyepiece 11 has a focal plane 28 and the eyepiece 12 has a focal plane 29. These focal planes are coincident, so that the eyepieces have a common focal plane 28/29. Like the objective 1, the eyepieces 11 and 12 are shown in a very simplified manner and would in fact normally be compound lenses.

In summary, when the microscope shown in FIG. 1 is in use, a primary beam bearing an image of a field of view 30 passes vertically upwards through the objective 1 to an underside of a metallized surface 13 of a prism 14. The surface 13 reflects the beam into a horizontal looped path in which the beam is divided into two secondary beams as described below, the looped path terminating at the upper side of the surface 13 whereby the two secondary beams are discharged vertically into the binocular viewing head 4.

An effect of the objective on the primary beam is to focus the field of view at a point along the horizontal looped path thereby to form a primary real orthoscopic image of the field of view in a plane 26 in the vicinity of a field lens 25. The effect of the field lens is to cause the image-bearing beam to converge as it passes through a Porro prism 15, a K-prism 16 and a quarter-wave retardation plate 17 until it reaches a field collimator 18, which collimates the orthoscopic image. The K-prism is a cemented assembly which has a metallized face 19 (FIG. 2) and which is mounted so as to be manually rotatable through 90° about the axis X—X shown in FIG. 2 between the position shown in FIG. 2 and a position in which the metallized face 19 occupies a horizontal plane vertically below the axis X—X.

Having passed through the field collimator 18, the primary beam enters a Swan cube 20 (FIG. 2). A Swan cube comprises two 45° – 45° – 90° prisms secured together with their hypoteneuse faces in intimate contact so as to form a cube. At the plane interface between the two prisms making up the Swan cube the primary beam is divided into the two secondary beams, one reflected and the other transmitted. The reflected beam (marked with a single arrow) passes from the cube through a quarter-wave retardation plate 21 and encounters a plane front surface mirror 22 which reflects the beam back through the plate 21 to the Swan cube interface which then finally transmits the beam out of the Swan cube. The transmitted beam (marked with a double arrow) passes from the cube through a quarter-wave retardation plate 23 and encounters a plane front surface mirror 24 which reflects the beam back through the plate 23 to the interface which then finally reflects the beam out of the Swan cube. The reflecting surfaces of the mirrors 22 and 24 lie in vertical planes inclined at right angles to one another. The interface of the Swan cube also lies in a vertical plane.

The plane of the Swan cube interface intersects the plane of the reflecting surface of the mirror 22 in a vertical line and intersects the plane of the reflecting surface of the mirror 24 in a vertical line. Thus the two lines of intersection are parallel; and with the Swan cube in its illustrated orientation with respect to the mirrors 22 and 24 the two lines of intersection are coincident. Where the present microscope differs from that shown in FIGS. 1 and 2 of U.K. Pat. specification No. 1,285,184 is in the mounting of the Swan cube. In the case of the present microscope the Swan cube 20, instead of being rotatable manually, by micrometer-controlled mounting means, relative to the mirrors 22 and 24 about a fixed vertical axis which intersects the horizontal looped path at a central point of the Swan cube interface which is equidistant from the two mirrors, is secured to a rigid arm 50 (FIG. 3), which is fixed at one end to a spring strip 31 mounted from a firm support 32 so that the spring strip acts as a flexure pivot for the rigid arm 50 and angular displacement of the Swan cube 20 is controlled by a lead screw 33 acting upon the arm 50. The mirrors 22 and 24 are mounted fixedly relative to the support 32. Strain gauges 34 and 35 are attached to opposite respective faces of the spring strip 31 so that the rotation of the Swan cube may be measured.

In the case of U.K. Pat. specification No. 1,285,184 the Swan cube 20 undergoes a pure rotation relative to the front surface mirrors 22 and 24, whereas in the present case the rotation of the Swan cube 20 is accompanied by translation thereof. However, this translation does not affect the image that is seen through the binocular viewing head 4, the image remaining in the same position in the field of view of the microscope as if the Swan cube 20 had undergone a pure rotation.

FIG. 4 shows the strain gauges 34 and 35 connected in a bridge network with two precision resistors 36 and 37 as the ratio arms. A potentiometer 38 is provided so that the bridge can be balanced for zero output at any given angular deflection of the Swan cube. The output from the bridge network is amplified by an operational amplifier 39 and then fed to a digital voltmeter 40 for display.

When the Swan cube 20 and the mirrors 22 and 24 are in the relative positions illustrated in FIG. 1, the transmitted beam and the reflected beam recombine at the interface and there is no image splitting. However, if the Swan cube is rotated through a small angle by flexure of the spring strip 31 the transmitted beam and the reflected beam do not recombine at the interface and, on finally leaving the Swan cube, the two secondary beams are spaced from one another and appear, immediately downstream of the Swan cube, to be mutually divergent from the reflecting surface of the mirror 22 (by saying that the two secondary beams are "spaced" from one another, it is meant that the central axes of the two beams are spaced from one another). The angle by which the two secondary beams diverge from one another depends on the angle through which the Swan cube is rotated from its illustrated orientation.

The secondary beams leaving the Swan cube encounter a vertical reflecting face of the prism 14 whereby the beams are reflected to the upper side of the metallized surface 13, which reflects the beams into a vertical plane. The vertically travelling beams pass through a telescope objective 6 and a thick quartz plate 27 before entering the binocular viewing head 4. The telescope objective 6 focuses the collimated images of the field of view into the common focal plane 28/29 of the two eyepieces 11 and 12 so that secondary real images are formed in that plane. These images are viewed through the eyepieces in conventional manner, and the image-splitting method of measuring the diameter of an object in the field of view can accordingly be employed, the gain of the amplifier 39 being adjusted by means of a variable feedback resistor 41 so that the digital voltmeter 40 gives a direct read-out in standard units (e.g., microns or micro-inches).

Further details concerning the components shown in FIGS. 1 and 2 and their functions can be found in U.K. Pat. specification No. 1,285,184.

Other circuit arrangements than that shown in FIG. 4 may of course be used. For example, the precision resistors 36 and 37 may be replaced by two further strain gauges attached to the flexure spring so that the bridge network is made up from four active strain gauges.

The image-splitting system of the present microscope has the following desirable features:
1. The accuracy of measurement is not degraded by friction bearings or lead screws.
2. Backlash errors are removed.
3. The accuracy of measurement is not degraded by wear of moving parts.
4. Zeroing and adjustment of sensitivity can be readily carried out by electrical means.
5. An easily read digital display of the measurements is provided.

Of course, the principles illustrated in FIGS. 3 and 4 of the accompanying drawings may also be applied, with appropriate modifications, to the image-splitting system of U.K. Pat. specification No. 901,319.

I claim:
1. An optical device comprising:
   a. a firm support portion;
   b. a flexure spring having first and second opposite ends of which the first is secured to the support portion;
   c. an optical member carried by the second end of the flexure spring and operative to deflect a light beam that is incident on the optical member to an extent that depends on the degree of flexure of the flexure spring; and d. a strain gauge mounted on the flexure spring and providing an electrical measure of said degree of flexure.

2. A device as claimed in claim 1, wherein said flexure spring comprises a strip of flexible material having first and second sides, said strain gauge being mounted on said first side of the strip, and wherein the device also comprises a second strain gauge mounted on said second side of the strip and a bridge circuit having two arms which are constituted respectively by said strain gauges.

3. A device as claimed in claim 1, wherein said optical member presents a plane reflecting surface to said light beam.

4. A device as claimed in claim 3, wherein said optical member is a Swan cube.

5. An optical instrument of the kind having an objective, eyepiece means for viewing a field of view under investigation imaged by means of the objective at a focal plane of the eyepiece means, and an image-splitting device which comprises a group of plane reflectors mounted so as to permit adjustment of the disposition of at least one reflector of the group relative to another and is arranged between the objective and the eyepiece means for splitting a primary light beam, received from the objective, into two secondary image-bearing light beams which, downstream of said group, are spaced from one another by a distance which is selectively variable by adjustment of said spatial relationship, wherein the improvement resides in that:

a. a flexure spring having two opposite ends is mounted in the image-splitting device;

b. the relatively adjustable reflectors are connected to the said two opposite ends respectively of the flexure spring, which undergoes flexure when such adjustment takes place; and c. a strain gauge is carried by the flexure spring and provides an electrical measure of the degree of flexure of the flexure spring.

6. An instrument as claimed in claim 5, wherein the flexure spring comprises a strip of flexible material which has first and second sides, said strain gauge being mounted on said first side, and the spring is secured at one of its said two opposite ends to a support to which at least one of said relatively adjustable reflectors is fixedly secured and carries at its other end another of said relatively adjustable reflectors, and wherein the instrument also comprises a second strain gauge, mounted on said second side of the strip, and a bridge circuit having two arms which are constituted respectively by said strain gauges.

7. An instrument as claimed in claim 6, wherein the reflector carried at said other end of the spring is constituted by a Swan cube.

8. For use in an optical instrument of the kind having an objective, and eyepiece means for viewing a field of view under investigation, imaged by means of the objective at a focal plane of the eyepiece means, an image-splitting device adapted to be arranged between the objective and the eyepiece means and comprising:

a. a group of plane reflectors mounted so as to permit adjustment of the disposition of at least one reflector of the group relative to another for splitting a primary light beam, received from the objective, into two secondary image-bearing beams which, downstream of said group, are spaced from one another by a distance which is selectively variable by such adjustment;

b. a flexure spring mounted in the device and having two opposite ends; and c. a strain gauge carried by the flexure spring and providing an electrical measure of the degree of flexure of the flexure spring, the relatively adjustable reflectors being connected to the said two opposite ends respectively of the flexure spring, which undergoes flexure when such adjustment takes place.

9. A device as claimed in claim 8, wherein the flexure spring comprises a strip of flexible material which has first and second sides, said strain gauge being mounted on said first side, and the spring is secured at one of its said two opposite ends to a support to which at least one of said relatively adjustable reflectors is fixedly secured and carries at its other end another of said relatively adjustable reflectors, and wherein the device also comprises a second strain gauge, mounted on said second side of the strip, and a bridge circuit having two arms which are constituted respectively by said strain gauges.

10. A device as claimed in claim 9, wherein the reflector carried at said other end of the spring is constituted by a Swan cube.

* * * * *